(12) United States Patent
Lundell (10) Patent No.: US 9,124,680 B2
(45) Date of Patent: Sep. 1, 2015

(54) MANAGED MATERIAL FABRIC FOR COMPOSITE HOUSING

(75) Inventor: Louis J. Lundell, Buffalo Grove, IL (US)

(73) Assignee: Google Technology Holdings LLC, Mountain View, CA (US)

(*) Notice: Subject to any disclaimer, the term of this patent is extended or adjusted under 35 U.S.C. 154(b) by 607 days.

(21) Appl. No.: 13/353,405

(22) Filed: Jan. 19, 2012

(65) Prior Publication Data

US 2013/0190052 A1 Jul. 25, 2013

(51) Int. Cl.
| | |
|---|---|
| *H04M 1/00* | (2006.01) |
| *H04M 1/02* | (2006.01) |
| *H04B 1/3888* | (2015.01) |
| *B29C 70/88* | (2006.01) |
| *H01Q 1/24* | (2006.01) |
| *B29L 31/34* | (2006.01) |

(52) U.S. Cl.
CPC ........... *H04M 1/0262* (2013.01); *B29C 70/882* (2013.01); *H04B 1/3888* (2013.01); *B29L 2031/3481* (2013.01); *B32B 2305/076* (2013.01); *H01Q 1/243* (2013.01)

(58) Field of Classification Search
CPC .......... H04B 1/3888; H04M 1/72519; H04M 1/0214; H04M 1/23; H04Q 1/243
USPC ............ 455/575.1, 575.2, 575.3, 575.4, 566, 455/550.1, 575.8, 90.3; 361/803, 814, 749; 379/433.01
See application file for complete search history.

(56) References Cited

U.S. PATENT DOCUMENTS

| | | | | |
|---|---|---|---|---|
| 5,845,218 | A * | 12/1998 | Altschul | 455/565 |
| 6,061,580 | A * | 5/2000 | Altschul et al. | 455/575.1 |
| 7,280,075 | B2 | 10/2007 | Koyama et al. | |
| 7,433,720 | B2 * | 10/2008 | Seol | 455/575.1 |
| 7,505,278 | B2 * | 3/2009 | Choi et al. | 361/749 |
| 7,620,174 | B1 * | 11/2009 | Bick | 379/433.01 |
| 7,869,842 | B2 * | 1/2011 | Kim et al. | 455/575.3 |
| 8,107,259 | B2 * | 1/2012 | Hirota et al. | 361/814 |
| 8,139,374 | B2 * | 3/2012 | Hiraoka | 361/803 |
| 8,265,717 | B2 * | 9/2012 | Gorsica et al. | 455/575.3 |
| 8,396,518 | B2 * | 3/2013 | Park et al. | 455/575.3 |
| 8,504,936 | B2 * | 8/2013 | Gimpl et al. | 715/778 |
| 8,618,415 | B2 * | 12/2013 | Wennemer et al. | 174/50 |
| 8,903,311 | B1 * | 12/2014 | Maryanka et al. | 455/41.1 |
| 2007/0293285 | A1 * | 12/2007 | Kang et al. | 455/575.1 |

(Continued)

FOREIGN PATENT DOCUMENTS

EP 19311116 A1 6/2008

OTHER PUBLICATIONS

International Preliminary Report on Patentability for PCT Patent Application No. PCT/US13/20730, mailed on Jul. 31, 2014, 12 pages.

(Continued)

*Primary Examiner* — Olumide T Ajibade Akonai (57) ABSTRACT

A mobile electronic communications device 100 is at least partially covered or encased in a composite housing 123, 134, 168 and 188. The composite housing can have at least one conductive housing portion 220 and 223 comprising a conductive material and at least one non-conductive housing portion 224 and 226 comprising a non-conductive material. Preferably, the non-conductive housing portion is positioned in proximity to an antenna 202, a battery door 194 or cover for a battery 126, in the mobile electronic communications device.

19 Claims, 9 Drawing Sheets

(56) References Cited

U.S. PATENT DOCUMENTS

| | | | |
|---|---|---|---|
| 2008/0088591 A1* | 4/2008 | Joo et al. | 345/170 |
| 2008/0242377 A1* | 10/2008 | Lee | 455/575.1 |
| 2009/0036568 A1* | 2/2009 | Merle et al. | 523/206 |
| 2009/0130995 A1 | 5/2009 | Wang Chen | |
| 2009/0265915 A1 | 10/2009 | Lee et al. | |
| 2010/0056232 A1* | 3/2010 | Lim et al. | 455/575.1 |
| 2010/0081489 A1* | 4/2010 | Ohba et al. | 455/575.3 |
| 2010/0240421 A1* | 9/2010 | Sekora et al. | 455/575.1 |
| 2011/0117872 A1 | 5/2011 | Tseng | |
| 2011/0155452 A1 | 6/2011 | Liu et al. | |
| 2011/0287818 A1* | 11/2011 | Ikuta | 455/575.1 |

OTHER PUBLICATIONS

Patent Cooperation Treaty, International Search Report and Written Opinion of the International Searching Authority for International Application No. PCT/US2013/020730, Jun. 18, 2013, 17 pages.

* cited by examiner

MANAGED MATERIAL FABRIC FOR COMPOSITE HOUSING

BACKGROUND OF THE INVENTION

1. Field of the Disclosure

The disclosure generally relates to electronic devices, and more particularly, to mobile electronic communications devices with antennas.

2. Background Art

Mobile phones and other electronic devices are very useful for: telephone calls; internet usage; e-mailing; texting; downloading; photography; video conferencing; surfing and searching the world wide web; retrieving, storing and viewing information; social networking; calculating; computing, playing games, etc. Mobile phones as well as other electronic communication devices typically are encased in housings and have antennas. Many mobile phones and other electronic communications devices have external antennas. However, more compact mobile phones and other electronic communication devices with sleeker or thinner designs have internal antennas.

While housings for mobile phones and other electronic communications devices have been made of one material, such as plastic, or metal, the use of multiple materials for a composite housing for mobile phones and other electronic communications devices has many advantages from a standpoint of performance, impact resistance, durability, and light weight.

In an attempt to produce thinner housings or enclosures, the use of carbon and glass filled woven plastic composite material have been suggested. This same plastic molded without woven internal structure is not very strong.

It is desirable to use carbon fiber for composite housings however the material is conductive and has negative impact on antennas. Therefore alternative nonconductive or radio frequency (FR) friendly materials should be used in areas of the product where the antennas are located. Separate pieces of different materials have been suggested to be placed into the tool when making composite housing, but the interface between the two materials has not consistent or cosmetically appealing because there will be some level of discontinuity between the weaves of the materials.

Over the years various attempts have been made to produces better housings for mobile phones and other electronic devices. These attempts have met with varying degrees of success It is, therefore, desirable to provide an improved electronic communications device with a managed material fabric composite housing which overcomes most, if not all, of the preceding problems.

SUMMARY OF THE INVENTION

An improved electronic communications device is provided with a unique managed material fabric composite housing for enhanced performance. Advantageously, the improved electronic communications device with a specially design composite housing is attractive, impact resistance, strong, durable, sleek, economical and effective.

The composite housing can use different materials in the setup of the warp weave direction in the fabric loom such that the conductive carbon materials are confined in certain areas and the rest of the fabric is made from nonconductive materials, such as aramid or glass. The weft of the weave can be either continuously nonconductive material yarn, or alternating usage of conductive and nonconductive yarn.

After the fabric is woven, then the fabric can be used in the making of composite part, such as a composite housing, and the final part can be cut from this material such that some areas of the part near the antenna(s) of the electronic communications device are the nonconductive areas of the fabric, and other areas away from the antenna(s) are made from the conductive carbon or other conductive materials.

The composite housing could be applied to housings of a handheld electronic device, such as the battery cover area or battery door, or a full housing, battery cover part, or battery door for a larger tablet electronic device, or other electronic communication devices where antennas are contained within the product or for a continuous composite housing for the exterior or casing of the electronic device.

Having different materials woven into a common fabric can assure a visual continuity of weave between the nonconductive areas and the conductive areas. By managing the color and/or appearance of the warp materials, for example, to both be black and then using an optionally contrasting nonconductive material for the weft, then any difference in visual appearance of the carbon versus the black aramid, for example, would be hard to visually discern. Therefore, the overall appearance of the fabric would appear with a uniform appearance as one constant look and not show any discontinuity in appearance as is common in conventional prior housings and casings.

The inventive electronic device with the special composite housing can have a higher strength carbon in non-antenna area and no carbon in antenna area. Instead of laminating the materials which increases thickness, the composite housing can be produced by varying the warp or filling the weave to incorporate the different material in different locations to produce a thinner sleeker housing.

The improved housing can also provide multiple fiber woven structural elements in an antenna plastic enclosure.

The electronic communications device of the invention can comprise a mobile electronic communications device that is at least partially covered or encased in a composite housing. The composite housing can have at least one conductive housing portion of a conductive material and at least one non-conductive housing portion of a non-conductive material. Preferably, the non-conductive housing portion is positioned in proximity to an antenna, a battery door or cover for a battery, in the electronic device. The antenna can be an external antenna or an interior antenna positioned within an interior of a mobile electronics communications device. Desirably, the non-conductive portion in positioned at a location to minimize interference with radio frequency (RF) signals received by or transmitted to the antenna.

The housing for the electronic communications device can comprise a composite fabric a woven sheet, a composite fiber-reinforced plastic (FRP), and/or a matrix of conductive fibers and non-conductive fibers. The material can comprise yarn. The conductive material can comprise carbon fibers, aluminum fibers or combinations thereof. The non-conductive material can comprise: aramid fibers, para-amid fibers, Kevlar fibers, Nomex fibers, Technora fibers, Haracron fibers, Twaron fibers, fiberglass, glass fibers, or combinations of any of the preceding. The matrix can comprise epoxy resin, polyester vinyl ester, nylon, a thermosetting resin, and/or a combination of any of the preceding.

The mobile electronics communications device can comprise: a radiotelephone, a cellular (cell) phone, a mobile phone, smart phone, flip phone, slider phone, android phone, tablet phone, camera phone, clamshell device, portable networking device, qwerty flip device, wireless device, portable gaming device, mobile communications device, personal digital assistant (PDA), wireless e-mail device, a two way pager, internet communication device, android tablet, ipod, ipad, blackberry, tablet device, laptop computer, notebook, personal computer, hand held electronic device, or combinations of any of the preceding.

A more detailed explanation of the invention is provided in the following detailed descriptions and appended claims taken in conjunction with the accompanying drawings.

DETAILED DESCRIPTION OF THE INVENTION

The following is a detailed description and explanation of the preferred embodiments of the invention and best modes for practicing the invention.

Referring to the drawings, a mobile electronic device 100 can comprise a flip 102 which can be pivotally connected by a hinge 104 to a base 106. The flip can be pivotable from a closed position, to partially open positions and to a fully open position and vise versa. The mobile electronic device can be movable to different orientations for providing different functionality in the partially open positions.

The mobile electronic device can be: a flip phone, slider phone, portable networking device, internet communications device, clamshell device, radio telephone, cellular phone, mobile phone, smart phone, portable gaming device, personal digital assistant, wireless e-mail device, two-way pager, handheld electronic device, or combinations of the preceding.

The mobile electronic device preferably is of a compact size for readily fitting in a shirt pocket, pants pocket, suit pocket, and/or purse.

The base and the flip each can have an outward (outer) surface 108 or 110, an inward (inner) surface 111, 112, 113, or 114, edges comprising longitudinal sides 115, 116, 117 or 118 in a portrait mode, and lateral ends 119, 120, 121 or 122 in a portrait mode.

The base has a transceiver housing 123 (xcvr) and defines an internal base compartment 124 (FIG. 12) that can provide a cavity for containing a battery 126 and a speaker 128. The base or transceiver housing can have a battery door or cover over the battery which can comprise part of the composite housing or can comprise the materials of the composite housing.

The base can have a keypad assembly 132 which can comprise a composite base housing (keypad housing) 134 with a rim 136 that can provide a periphery that can surround or partially surround a keypad 138. The keypad assembly can have backlighting below the keypad. The keypad can be positioned on the outward surface of the base and can face downwardly when the flip is in the partially open position, such as in a media viewing mode. The keypad can be partially transparent, clear and light transmissive. The keypad can comprise: a qwerty keypad, capacitive keypad, keyboard, alpha numeric keys, a base touchscreen, or combinations of the preceding. The keypad can have a capacitive touch surface. The keypad can occupy most, preferably 70% to 99%, of the outward surface of the base.

The keypad can also comprise a moldprint keypad with graphics on the underside of the keypad or on a layer below the keypad. Such graphics for the keypad can include one or more of the following: text, numbers, characters, alpha numeric images, color graphics, black graphics, moving graphics, animation, video clips, logos, photographs, decorations, designs, symbols, and other images.

In one embodiment, the keypad comprises a tactile qwerty keypad positioned over a series of switches (domes) which a user can depress. The keypad may also change or transform in response to the press of a button or mode change in the user interface from a tactile qwerty keypad to a keypad with a disabled area and a touchable area for user input.

A display structure assembly 164 can provide a display module 166 with display housing 168 and a touchscreen display 170 on the outward surface of the flip. The display housing can comprise part of the composite housing. The display can be positioned opposite the keypad when the flip is in a closed position in a tablet mode. The display can face upwardly with and in proximity to the keypad when the flip in a fully open position in an e-mail/text mod. The display can be positioned at an angle of inclination when the flip is in a partially open position in a media viewing mode. The display can occupy most, preferably 70% to 99%, of the outward surface of the base.

The display can comprise a touchscreen comprising a touch sensitive lens 172 with an input lens surface 174. Touch sensors can be integrated to either the input surface or the opposite surface of the lens. The touch sensor generates a signal in response to a manually engageable haptic input from a user when the user touches the lens with a finger to emit light forming an image on the lens. The touchscreen display can be can be transparent, clear and light transmissive and can comprise a capacitive touchscreen, an organic light emitting display (OLED) or a liquid crystal display (LCD).

A touchpad assembly 186 can provide a touchpad sensor 202 with a touchpad cover 204. The touchpad assembly can also have a moveable composite flip housing 188 (touchpad housing) and a bezel (touchpad bezel) which can provide a backplate (touchpad backplate), with or without a rim, for holding the touchpad, such as with adhesive. The flip housing can comprise part of the composite housing. A touchpad gasket can be positioned between and sealing the touchpad housing to a peripheral portion of the touchpad.

The touchpad can be positioned on the inward surface of the flip at a location which is transversely opposite of the display. The touchpad can be a capacitive touchpad for detecting the position of the flip. The touchpad can provide navigation control within the user interface (UI) on the display, such as, but not limited to: highlighting a web link on the display, scrolling through text on the display, clicking to enter a command on the display, and/or implementing a mouse cursor on the touchscreen. The touchpad can also comprise one or more of the following: a zoom control, a magnifier, scroll bar, scroll control, a slide bar in a browser window, enter key, command key, shift key, visual selector, cursor, and/or pointer. The touchpad can occupy a substantial portion, such as from 25% to 75%, of the inward surface of the flip. In the illustrative embodiment, the touchpad is smaller and occupies a smaller area than either the touchscreen display or the keypad. The flip assembly can also have a slot providing a supplemental audio port 193.

The touchpad can be positioned to be touched by the user without blocking viewing of the display when the flip is in the partially open and fully open positions. The touchpad can be hidden and inaccessible when the flip is in the closed position.

Figure 9:
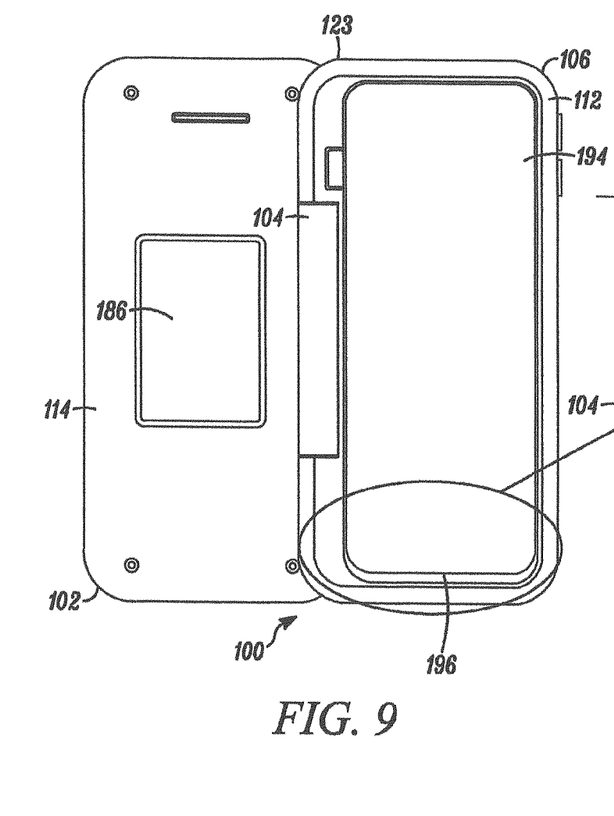
FIG. 9 is a back view of the mobile electronic device shown in the fully open position and illustrating the speaker port.
Figure 10:
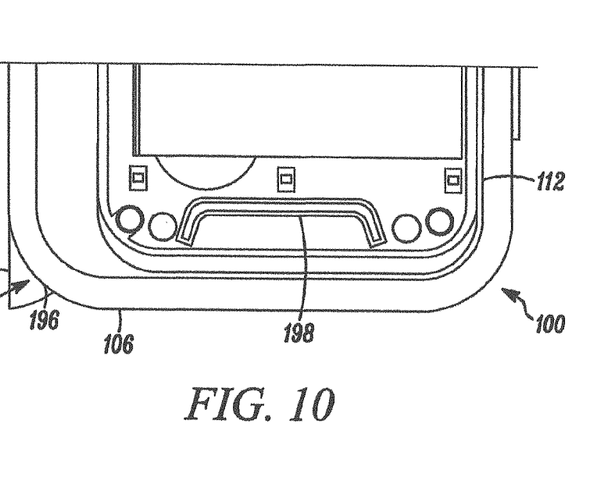
FIG. 10 is an enlarged back view of part of the mobile electronic device shown in the open position and illustrating the acoustic seal and battery door.

A removable battery door 194 (FIG. 9) can be positioned along the inward surface of the base at a location transversely opposite of the keypad. The removable battery door can be substantially hidden and inaccessible when the flip is in the closed position. The removable battery door can provide a cover over the battery and can comprise part of the composite housing or can comprise the materials of the composite housing.

A speaker port 196 (FIG. 9) can be hidden underneath the removable battery door. The speaker port can provide an acoustical passageway for emitting sound from the speaker.

An acoustic seal 198 (FIG. 9) can be positioned underneath the battery door for sealing the speaker port and directing travel of sound from the speaker underneath the battery door to produce enhanced audio.

Figure 11:
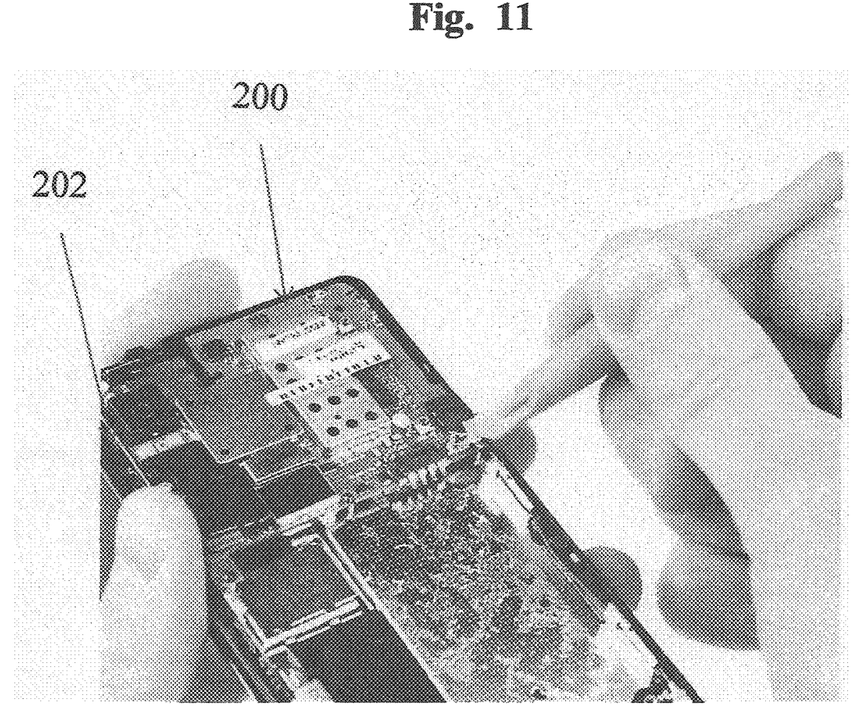
FIG. 11 is perspective view of an interior section of the mobile electronic device and illustrating a printed circuit board (PCB) and an interior internet antenna.

The base or flip can have an internal compartment that provides a cavity to contain a printed circuit board 200 (PCB) (FIG. 11) that can be connected to an interior internal antenna 202. The transceiver housing, base housing, of flip housing can provide a non-conductive antenna housing, A pattern of capacitive touch traces or wires can be embedded within the printed circuit board for detecting a user's finger gestures without increasing the size of the mobile electronic device. Non-conductive decorative layers can be provided to bring the touch surface of the touchpad flush with the touchpad housing.

The hinge can comprise a friction hinge which can have a radial range of motion of 180 degrees or more and can have detents at both ends of travel. This can be achieved through the use of an asymmetrical cam in conjunction with a single tab on a follower. The friction hinge can allow a full 360 degree range of motion with any number of detents at any radial position. The friction hinge also provides a dependable and inexpensive way to produce a tilt in the display of a qwerty flip device or in a qwerty mode.

The asymmetric cam can have a cam face which provides an asymmetrical cam surface upon which the follower rides. The asymmetrical cam surface can have two or more detents including, but not limited to, a first detent at a zero (0) degree position for closing the electronic device and a second detent at a position at or beyond 180 degrees so that the electronic device can be partially opened and subsequently pivoted to a fully opened position with the flip opened at an angle at or beyond 180 degrees relative to the base. The detents of the asymmetrical cam can be separated by 210 degrees to allow for 190 degrees of travel and 10 degrees of preload at both ends of travel. In some circumstances, it may be desirable that the cam has more than two detents. The asymmetrical cam can have diametrically opposite curved surfaces diametrically opposite generally flat planar surfaces.

Figure 5:
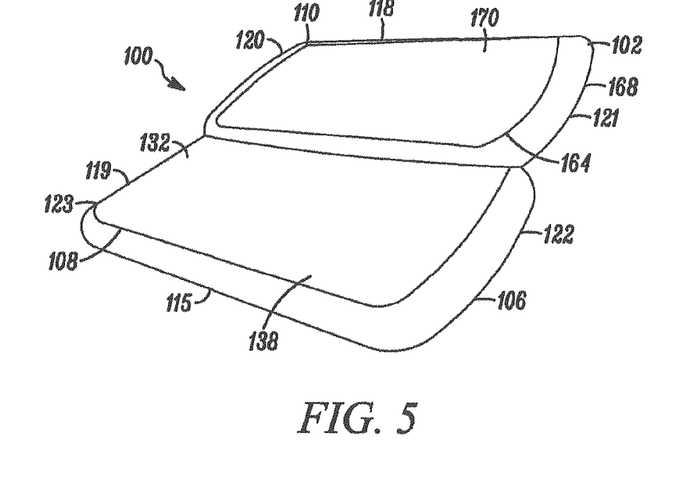
FIG. 5 is a perspective view of the mobile electronic device shown in a fully open position in a text-entry mode.
Figure 6:
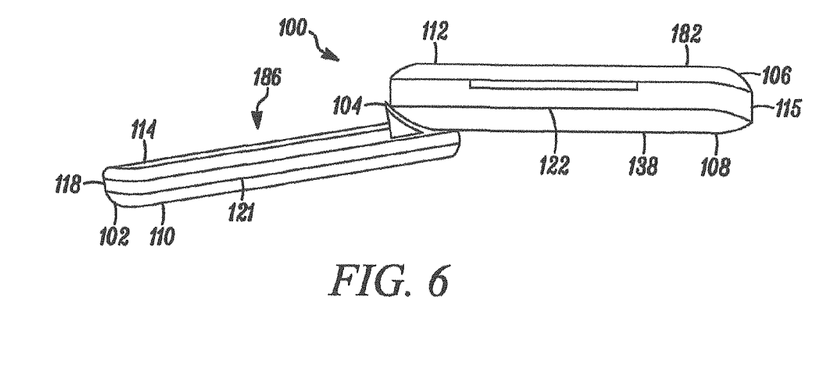
FIG. 6 is a side view of the mobile electronic device shown in the fully open position in the text-entry mode.
Figure 7:
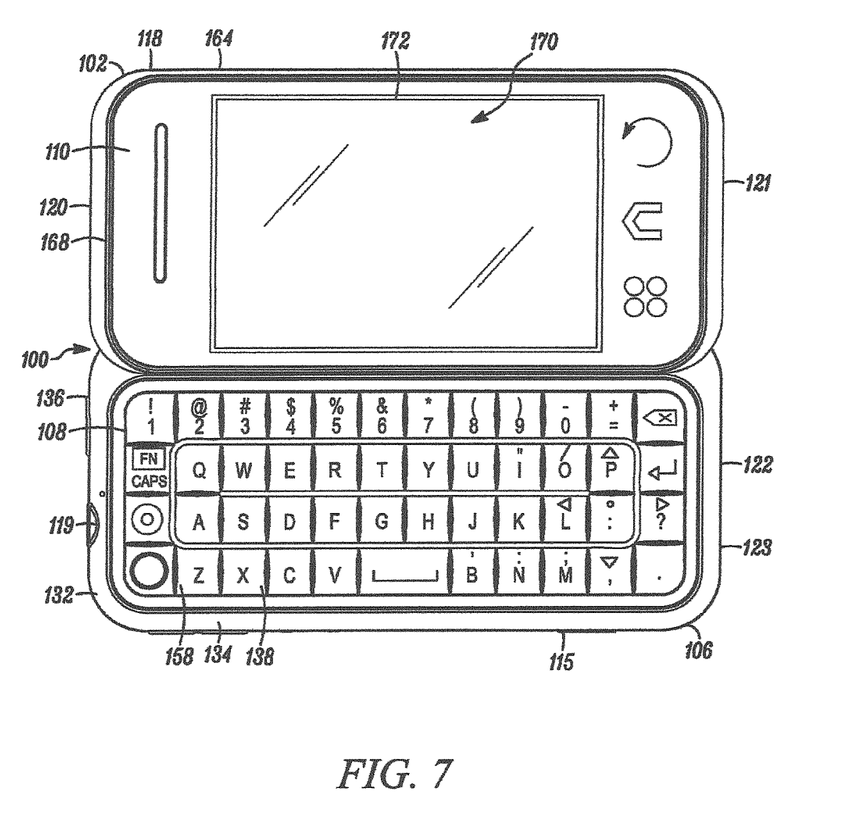
FIG. 7 is a front view of the mobile electronic device shown in the fully open position.
Figure 8:
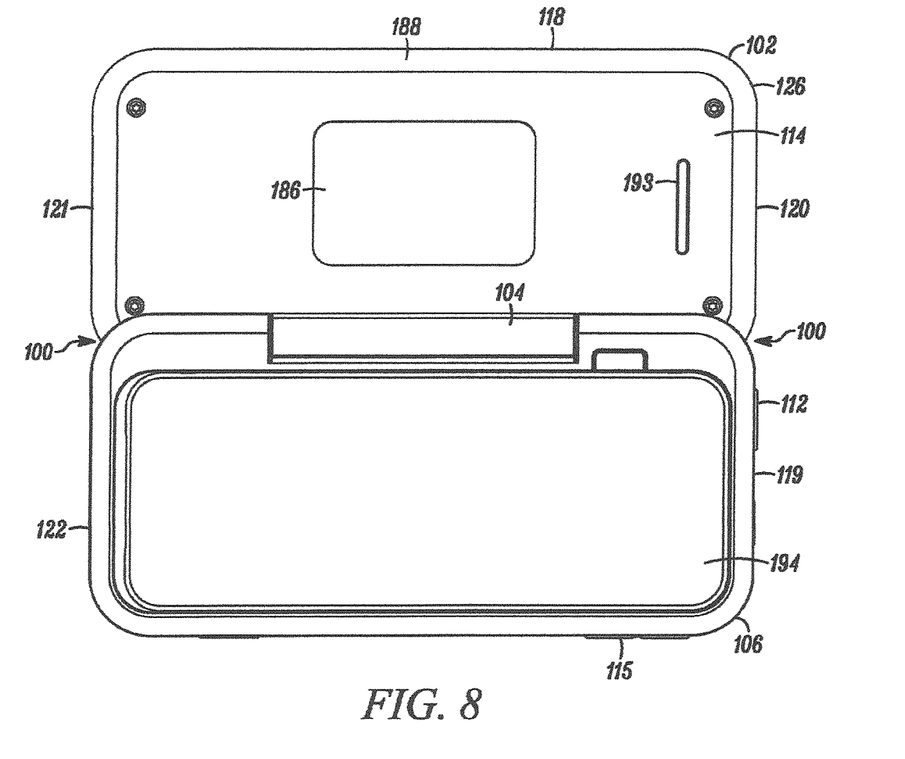
FIG. 8 is a back view of the mobile electronic device shown in the fully open position.

The friction hinge can provide specific positions of the electronic device including: (1) a closed position in a tablet mode as shown in FIGS. 1 and 2 in which the flip and base are positioned at a zero (0) degree angle relative to each other at a closing torque, (2) a fully open position in a qwerty mode as shown in FIGS. 5 and 6 in which the flip and base are positioned at a open angle at or substantially greater than about 180 degrees at a fully open qwerty torque, and (3) a partially open position in a media viewing mode as shown in FIGS. 3 and 4 in which the flip and base are positioned at an open angle substantially greater than the closed position but substantially less than fully open position at a torque less than the closing torque and the fully open torque.

In the illustrated embodiment, the partially open position in the media viewing mode ranges from 70 degrees to 100 degrees and the fully open position is 180 degrees to 190 degrees in the qwerty mode.

Figure 1:
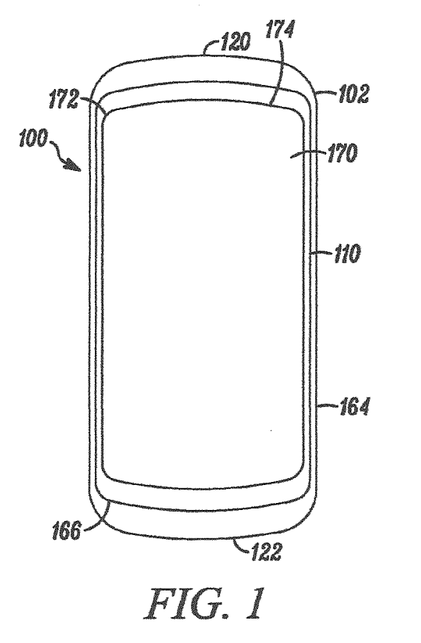
FIG. 1 is a front view of a mobile electronic device in accordance with principles of the present invention of the present disclosure shown in a closed position in a tablet mode in which the flip and base are positioned at a zero (0) degree angle relative to each other.
Figure 2:
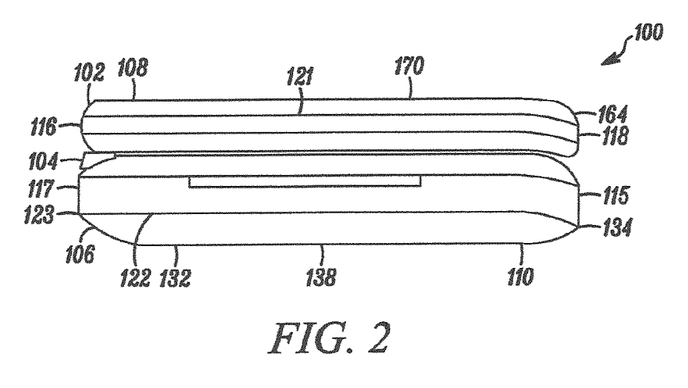
FIG. 2 is a side view of the mobile electronic device shown in the closed position in the tablet mode.

In operation and use, in the tablet mode of FIGS. 1 and 2, the flip is held closed using the first detent in the cam. In the closed position, the interior inwardly facing inward surfaces of the flip and base abut and face each other so as to be hidden from view in the interior of the electronic device and are not accessible to the user. In the closed position, the exterior outer surfaces of the flip and base are visible and accessible to the user.

Figure 3:
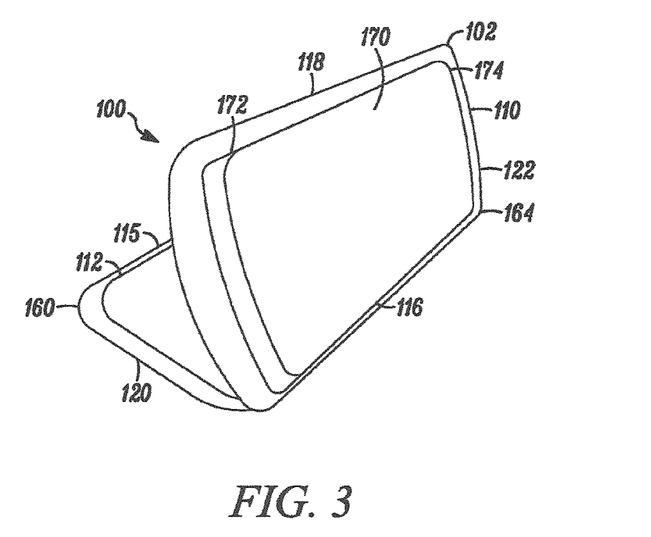
FIG. 3 is a perspective view of the mobile electronic device shown in a partially open position in a media viewing mode.
Figure 4:
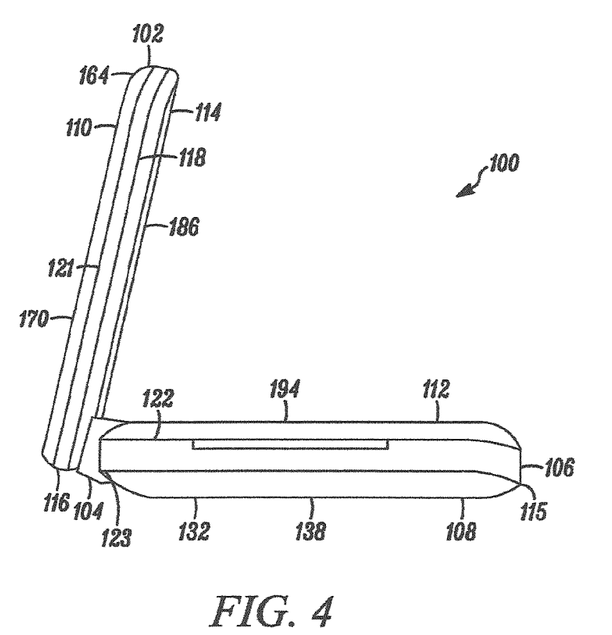
FIG. 4 is a side view of the mobile electronic device shown in the partially open position in the media viewing mode.

In the media viewing mode as shown in FIGS. 3 and 4, the user sets of the desired angle of the flip and the flip is then held open with a holding torque produced by the friction between the asymmetrical cam and the follower. In the partially open, media viewing mode, the user sets the desired angle of the flip to access the inward surfaces of the flip and base.

In the fully open position as shown in FIGS. 5 and 6, the flip is held open at about 190 degrees using the second detent in the asymmetrical cam. In the fully open position the user can readily and fully access the touchpad, keypad, battery door and touchscreen display.

The composite base housing and composite flip housing can each comprise a composite fiber-reinforced plastic (FRP) housing comprising a matrix 210 (FIGS. 12 and 13) with a warp 212 and weft 214 of interwoven conductive fibers 216 and non-conductive fibers 218. The FRP housing can have at least one conductive housing portion 220 and 223 and at least one non-conductive housing portion 224 and/or 226. The conductive housing portion can have a substantially greater amount and concentration of conductive fibers than non-conductive fibers. The non-conductive housing portion can have a substantially greater amount and concentration of non-conductive fibers than conductive fibers.

Figure 12:
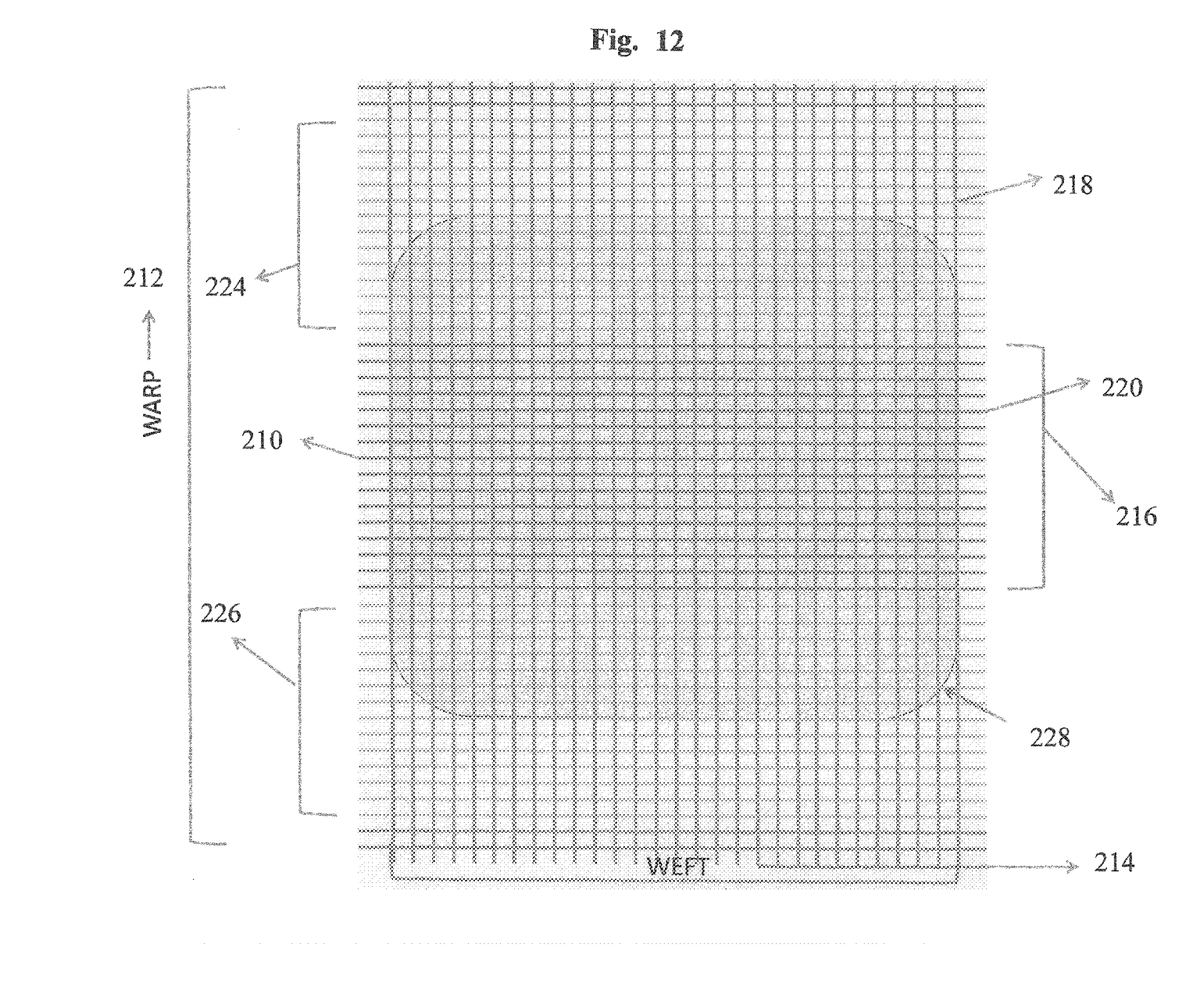
FIG. 12 is an enlarged view of part of a composite housing of the mobile electronic device in accordance with principles of the present invention and illustrating conductive and non-conducive portions.
Figure 13:
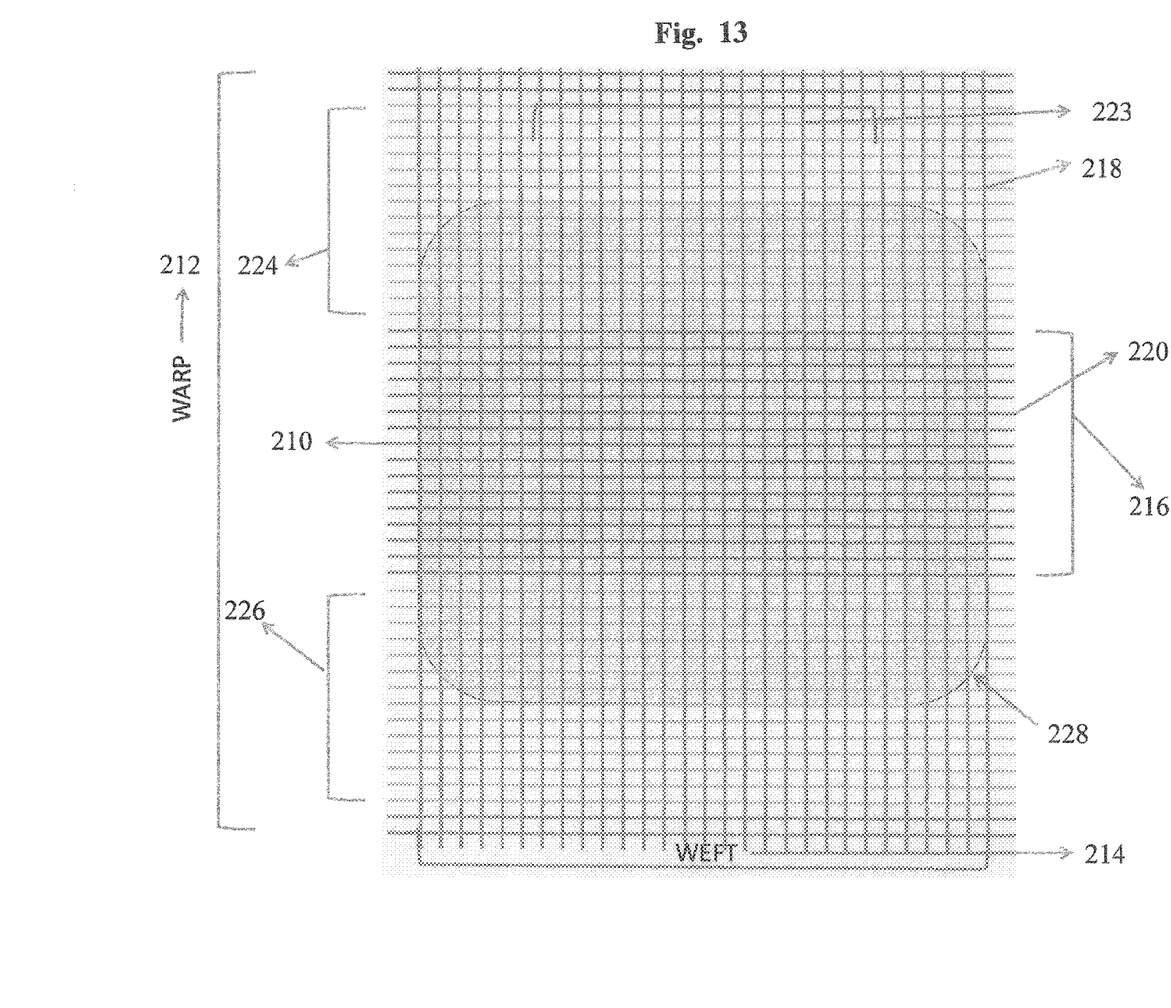
FIG. 13 is an enlarged view of another part of a composite housing of the mobile electronic device in accordance with principles of the present invention and illustrating conductive and non-conducive portions.

The non-conductive housing portion and non-conductive fibers are positioned in proximity to the interior antenna to substantially minimize interference with radio frequency (RF) signals (waves) received by and/or transmitted to the interior antenna. The non-conductive housing portion can be molded or part shape cut 228 to have areas of non-conductive fibrous material on one or two sides as needed for antenna keep outs.

The matrix can comprise epoxy resin, polyester, vinyl ester, or another thermosetting resin. The conductive fibers can comprise carbon fibers, such as 3K carbon 35 mm carbon fibers, and/or other conductive fibers such as aluminum fibers.

The non-conductive fibers can comprise aramid fibers, such as 35 mm black aramid fibers, and/or other non-conductive fibers such as glass fibers (fiber glass).

The electronic communications device can comprise a base and a moveable portion, such as a flip or a slide, operatively connected to the base. The flip can be connected by a hinge to the base. The slide comprises a slidable portion and is slidable connected to the base. The moveable portion can be moved from an open position to a closed position and vice versa. In the illustrative embodiment, electronic communications device comprises a base housing covering at least a part of the base and a moveable housing covering at least part of the moveable portion. Desirably, at least one of the housings, the base housing and/or moveable housing, comprises a composite housing with a conductive housing portion of conductive material and a non-conductive housing portion of non-conductive material.

The electronic communications device can have an antenna operatively connected to and positioned in the base or moveable portion. Preferably, the non-conductive housing portion is positioned in proximity to the antenna. The electronic communications device can also have one or more of the following components: touchpad, keypad, display, screen, a printed circuit board, a touch sensitive printed circuit board embedded with capacitive touch traces for detecting a user's finger gestures.

The composite housing comprises a composite fiber-reinforced plastic (FRP). The conductive material can comprise conductive fibers, such carbon fibers and/or aluminum fibers. The non-conductive material can comprise non-conductive fibers such as aramid fibers, para-amid fibers, and/or glass fibers.

In the illustrated embodiment, the electronic communications device has moveable sides comprising a base providing a bottom and a top operatively connected to the base. The moveable sides are moveable from an open position to a closed position and vice versa. The top can be a flip connected by a hinge to the base or the top can be a slide comprising a slidable portion slidably connected to the base. The electronic communications device can have an interior antenna positioned internally within an interior of one of the sides. Each of the sides can have a housing for covering at least part of the sides. At least one of the housings can comprise a composite fiber reinforced plastic (FRP) housing comprising a matrix of conductive fibers and non-conductive fibers. The composite fiber-reinforced plastic housing desirably has a substantially greater concentration and amount of non-conductive fibers in proximity to the antenna at a location to substantially minimize interference with radio frequency (RF) signals received by and/or transmitted to the antenna. The matrix can comprise epoxy resin, polyester vinyl ester, nylon, a thermosetting resin, or combinations of any of the preceding. The conductive fibers can comprise: carbon fibers and/or aluminum fibers. The non-conductive fibers can comprise: aramid fibers, para-amid fibers, glass fibers, or combinations of the preceding.

The electronic communications device preferably comprises a mobile electronic communications device, such as a: radiotelephone, a cellular (cell) phone, a mobile phone, smart phone, flip phone, slider phone, android phone, tablet phone, camera phone, clamshell device, portable networking device, qwerty flip device, wireless device, portable gaming device, mobile communications device, personal digital assistant (PDA), wireless e-mail device, a two way pager, internet communication device, android tablet, ipod, ipad, blackberry, tablet device, laptop computer, notebook, personal computer, hand held electronic device, or combinations of any of the preceding. The mobile electronic communications device can be of a compact size for readily fitting into a shirt pocket, pants pocket, suit pocket and/or purse.

The composite fiber-reinforced plastic housing a transceiver housing, base housing, display housing, flip housing, battery door, non-conductive antenna housing or combinations of the preceding.

Fiber reinforced plastics are a category of composite plastics that use fibrous materials to mechanically enhance the strength and elasticity of plastics. The original plastic material without fiber reinforcement is sometimes referred to as the matrix. The matrix is a tough but relatively weak plastic that can be reinforced by stronger stiffer reinforcing filaments or fibers. The extent that strength and elasticity are enhanced in a fiber reinforced plastic depends on the mechanical properties of both the fiber and matrix, their volume relative to one another, and the fiber length and orientation within the matrix. Reinforcement of the matrix can occur because the fiber reinforced plastics (FRP) material exhibits increased strength or elasticity relative to the strength and elasticity of the matrix alone.

Producing fiber reinforced plastics (FRP) can involve two distinct processes: (1) the process in which the fibrous material is manufactured and formed, and (2) the process in which fibrous materials are bonded with the matrix.

Fibrous materials can be bonded to a matrix with fiber preforms. Fiber preforms can be manufactured in sheets, continuous mats, or as continuous filaments for spray applications. Typical ways to manufacture the fiber preform is though the textile processing techniques of weaving, knitting, braiding and stitching.

Weaving preforms to bond fibrous materials to a matrix can be done in a conventional manner to produce two-dimensional fibers as well in a multilayer weaving that can create three-dimensional fibers. Multilayer weaving is usually required to have multiple layers of warp yarns, but this can cause disadvantages in manufacturing, such as excessive time to set up all the warp yarns on the loom. Therefore, multilayer weaving is often used to produce relatively narrow width products or high value products where the cost of the preform production is acceptable. Another one of the main problems facing the use of multilayer woven fabrics is the difficulty in producing a fabric that contains fibers oriented with angles other than 0" and 90" to each other respectively.

Braiding preforms to bond fibrous materials to a matrix is suited to the manufacture of narrow width flat or tubular fabric and is usually not as capable as weaving in the production of large volumes of wide fabrics. Braiding can be done over top of mandrels that vary in cross-sectional shape or dimension along their length. Braiding can be limited to objects about a brick in size. Unlike the standard weaving process, braiding can produce fabric that contains fibers at 45 degrees angles to one another. Braiding three-dimensional fibers can be done using four step, two-step or multilayer interlock braiding. The use of four step or row and column braiding can utilize a flat bed containing rows and columns of yarn carriers that form the shape of the desired preform. Additional carriers can be added to the outside of the array. The precise location and quantity of additional carriers can depend upon the exact preform shape and structure required. There are usually four separate sequences of row and column motion, which act to interlock the yarns and produce the braided preform. The yarns can be mechanically forced into the structure between each step to consolidate the structure in a similar process to the use of a reed in weaving. Two-step braiding is unlike the four step process because the two-step can include a large number of yarns fixed in the axial direction and a fewer number of braiding yarns. The process can comprise two steps in which the braiding carriers move completely through the structure between the axial carriers. This relatively simple sequence of motions is capable of forming preforms of essentially any shape, including circular and hollow shapes. Unlike the four step process the two step process does not usually require mechanical compaction the motions involved in the process allows the braid to be pulled tight by yarn tension alone. Another type of braiding is multilayer interlocking braiding that can comprise a number of standard circular braiders being joined together to form a cylindrical braiding frame. The frame can have a number of parallel braiding tracks around the circumference of the cylinder but the mechanism can allow the transfer of yarn carriers between adjacent tracks forming a multilayer braided fabric with yarns interlocking to adjacent layers. The multilayer interlock braid differs from both the four step and two-step braids in that the interlocking yarns are primarily in the plane of the structure and do not significantly reduce the in-plane properties of the preform. The four step and two step processes produce a greater degree of interlinking as the braiding yarns travel through the thickness of the preform, but contribute less to the in-plane performance of the preform. A disadvantage of the multilayer interlock equipment is that due to the conventional sinusoidal movement of the yarn carriers to form the preform, the equipment is not able to have the density of yarn carriers that is possible with the two step and four step machines to form preforms to bond fibrous materials to a matrix.

Knitting fiber preforms to bond fibrous materials to a matrix can be done with warp and weft knitting. The fabric produced is often considered as two-dimensional fabric, but machines with two or more needle beds are capable of producing multilayer fabrics with yarns that traverse between the layers. Electronic controls for needle selection and knit loop transfer and sophisticated mechanisms that allow specific areas of the fabric to be held and their movement controlled, can automate the fabric into a required three-dimensional preform shape with a minimum of material wastage.

Stitching preforms to bond fibrous materials to a matrix is one of the simplest of the four main textile manufacturing techniques and can be performed with the smallest investment in specialized machinery. Basically the stitching process comprises inserting a needle, carrying the stitch thread, through a stack of fabric layers to form a three dimensional structure. The advantages of stitching are that it is possible to stitch both dry and prepreg fabric, although the tackiness of the prepreg can make the process difficult and can cause more damage within the prepreg material than in the dry fabric. Stitching also utilizes the standard two-dimensional fabrics that are commonly in use within the composite industry. The use of standard fabric also allows a greater degree of flexibility in the fabric lay-up of the component than is possible with the other textile processes, which have restrictions on the fiber orientations that can be produced.

There are two distinct categories of molding processes using fiber reinforced plastics (FRP): (1) composite molding and (2) wet molding. Composite molding uses prepreg FRP in that the plastics are fiber reinforced before being put through further molding processes. Sheets of prepreg FRP can be heated and/or compressed in different ways to create geometric shapes. Wet molding combines fiber reinforcement and the matrix or resist during the molding process.

Bladder molding is a type of composite molding in which individual sheets of prepreg material can be laid-up and placed in a female-style mold along with a balloon-like bladder. The mold can be closed and placed in a heated press. The bladder can be pressurized forcing the layers of material against the mold walls. The part can be cured and removed from the hot mold. Bladder molding is usually a closed molding process with a relatively short cure cycle between 15 and 60 minutes making it desirably for making complex hollow geometric shapes at competitive costs.

Compression molding is another type of composite molding in which a preform or charge of a prepreg fabric of a sheet or bulk molding compound is placed into mold cavity. The mold can be closed and the material is compacted and cured inside by pressure and heat. Compression molding offers excellent detailing for geometric shapes ranging from pattern and relief detailing to complex curves and creative forms, to precision engineering often within a maximum curing time of 20 minutes.

Autoclave or vacuum bag molding is another type of composite molding in which individual sheets of prepreg material can be laid-up and placed in an open mold. The prepreg material can be covered with release film or a bleeder or breather material as well as a vacuum bag. A vacuum can sucked or pulled on the composite part and the entire mold can be placed into an autoclave comprising a heated pressure vessel. The composite part can be cured with a continuous vacuum to extract entrapped gasses from the laminate. This process can provide precise control to a long slow cure cycle of one to two hours. This precise control creates the exact laminate geometric forms for the composite part needed to ensure strength, but it can be slow, labor intensive and expensive.

Mandrel wrapping molding is another type of composite molding in which sheets of prepreg material can be wrapped around a steel or aluminum mandrel. The prepreg material can be compacted by nylon or polypropylene cellophane tape. Composite parts are typically batch cured by hanging in an oven. After curing, the cellophane and mandrel can be removed producing a strong hollow carbon tube.

Wet layup molding is another type of composite molding in which fiber reinforcing fabric can be placed in an open mold and then saturated with a wet resin by pouring it over the fabric and pressing it into the fabric and mold. The resin in the mold is left to cure, usually at room temperature, though heat is sometimes used to enhance curing. Glass fibers are most commonly used for this process, the results are widely known as fiberglass.

Chopper gun molding is another type of composite molding in which continuous strands of fiberglass are fed through a hand-held gun that both chops the strands and combines them with a catalyzed resin such as polyester. The impregnated chopped glass can be shot or sprayed onto the mold surface to the desired thickness. The chopper gun molding process is good for large production runs at economical cost, but can produces geometric shapes with less strength than other molding processes and can produce composite parts with mediocre dimensional tolerance.

Filament winding molding is another type of composite molding in which winding machines pull fiber bundles of fibers through a wet bath of resin and wound over a rotating steel mandrel in specific orientations. Composite parts can be cured either room temperature or elevated temperatures. The mandrel can be extracted, leaving a final geometric shape for the composite part.

Pultrusion molding is another type of composite molding in which fiber bundles and slit fabrics are pulled through a wet bath of resin and formed into the rough part shape. Saturated material can be extruded from a heated closed die during curing while being continuously pulled through die.

Resin transfer molding (RTM) and vacuum assisted resin transfer molding (VARTM) are other type of composite molding in which fabrics are placed into a mold and injected with wet resin. The resin is typically pressurized and forced into a cavity which is under vacuum in the RTM process. Resin is entirely pulled into cavity under vacuum in the VARTM process. This molding process allows precise tolerances and detailed shaping but can sometimes fail to fully saturate the fabric leading to weak spots in the final shape.

Fiber reinforced plastics (FRP) can use textile glass fibers; textile fibers are different from other forms of glass fibers used for insulating applications. Textile glass fibers begin as varying combinations of silicon oxide ($SiO_2$), aluminum oxide ($Al_2O_3$), boric oxide ($B_2O_3$), calcium oxide (CaO), or magnesium oxide (MgO) in powder form. These mixtures can be heated through a direct melt process to temperatures around 1300 degrees Celsius, after which dies can be used to extrude filaments of glass fiber, such as ranging in diameter from 9 to 17 μm. These filaments can then be wound into larger threads and spun onto bobbins for transportation and further processing.

Glass fiber material processes can comprise: a roving process, a fiber fabric process, fiber mat process, chopped fiber glass process, and a glass fiber short stands process. In the roving process, glass filaments are spun into larger diameter threads. These threads are then commonly used for woven reinforcing glass fabrics and mats, and in spray applications. In the fiber fabric process, a web-form fabric reinforcing material is produced with fibers in both the warp and weft directions. In the fiber mat process, web-form non-woven mats of glass fibers are produced in cut dimensions with chopped fibers or in continuous mats using continuous fibers. In the chopped fiber glass process, lengths of glass threads can be cut between 3 and 26 mm, and the threads are then used in plastics for molding. In the glass fiber short strands process, short 0.2-0.3 mm strands of glass fibers can be used to reinforce thermoplastics for injection molding.

Carbon fiber can be produced when polyacrylonitrile fibers (PAN), pitch resins, or rayon are carbonized through oxidation and thermal pyrolysis at high temperatures. Through further processes of graphitizing or stretching the fibers, strength or elasticity can be enhanced respectively. Carbon fibers can be manufactured in diameters analogous to glass fibers, such as with diameters ranging from 9 to 17 p.m. Carbon fibers can be wound into larger threads for transportation and further production processes, such as weaving or braiding into carbon fabrics, cloths and mats.

Aramid fibers are most commonly known under the brand names of Kevlar, Nomex and Technora. Aramids can be formed by the reaction between an amine group and a carboxylic acid halide group (aramid). This can occur when an aromatic polyamide is spun from a liquid concentration of sulfuric acid into a crystallized fiber. Fibers can then be spun into larger threads in order to weave into large ropes or woven fabrics Aramid fibers can be manufactured with varying grades based on varying qualities for strength and rigidity.

The fibers of the fabric can include non-conductive fibers with at least one of Kevlar, Nomex, Technora, Haracron or Twaron, for providing a thin, durable, resilient and flexible material for the composite housing. The above list is not exhaustive and there are other similar fibers that can be used in the composite housing. These fibers can expand as the components and materials of the electronic device, expands over time, or contract.

The composite housing can comprise a woven sheet of conductive fibers as well as non-conductive fibers, such as an aramid fiber, for providing a thin, durable, resilient and flexible housing. The aramid fibers can include a combination of woven fibers, such as Kevlar with one or more of Nomex, Technora, Haracron or Twaron, for example. Kevlar is the registered trademark for a para-aramid synthetic fiber, and is related to other aramids such as Nomex, Heracron and Technora. Aramids and para-aramid fibers like Kevlar and Twaron, provide attractive properties, such as good strength-to-weight properties; high Young's modulus; high tenacity; low creep; and low elongation at break (~3.5%).

The non-conductive fibers can comprises an aramid fiber or a para-aramid synthetic fiber, for providing a durable, resilient and flexible material. Aramid fibers are a class of heat-resistant and strong synthetic fibers. The name is a portmanteau of "aromatic polyamide". They are fibers in which the chain molecules are highly oriented along the fiber axis, so the strength of the chemical bond can be used.

Among the many advantages of the improved electronic communications device is provided with the composite housing are:
1. Superior performance.
2. Superb communications.
3. Enhanced operations by help minimizing interference with radio frequency (RF) signals received by or transmitted to said antenna.
4. Strong.
5. Sleek.
6. Impact resistant.
7. Comfortable.
8. Reliable.
9. User friendly.
10. Easy to operate.
11. Durable
12. Economical.
13. Attractive.
14. Efficient.
15. Effective.

Although embodiments of the invention have been shown and described, it is to be understood that various modifications, substitutions, and different materials, rearrangements of parts, components, and/or process (method) steps, as well as other uses of the managed material fabric for composite housing can be made by those skilled in the art without departing from the novel spirit and scope of this invention.

What is claimed is:
1. An electronic communications device, comprising:
a mobile electronic communications device;
a composite housing comprising:
   a matrix of conductive fibers and non-conductive fibers; and
   at least one conductive housing portion and at least one non-conductive housing portion, said composite housing covering at least a portion of said mobile electronics communications device;
said conductive housing portion comprising a conductive material; and
said non-conductive housing portion comprising a non-conductive material.
2. An electronic communications device in accordance with claim 1 wherein:

said electronic communications device comprises a component selected from the group consisting of an antenna, a battery door and a cover for a battery; and
said non-conductive housing portion is positioned in proximity of said component.

3. An electronic communications device in accordance with claim 2 wherein said non-conductive portion in positioned at a location to minimize interference with radio frequency (RF) signals received by or transmitted to said antenna.

4. An electronic communications device in accordance with claim 1 wherein said antenna comprises an interior antenna positioned within an interior of said mobile electronics communications device.

5. An electronic communications device in accordance with claim 1 wherein said housing comprises a composite fabric.

6. An electronic communications device in accordance with claim 1 wherein:
at least one of said materials comprises a yarn; and
said housing comprises a woven sheet.

7. An electronic communications device in accordance with claim 1 wherein said conductive material is selected from the group consisting of: carbon fibers, aluminum fibers and combinations thereof.

8. An electronic communications device in accordance with claim 1 wherein said non-conductive material is selected from the group consisting of: aramid fibers, para-amid fibers, Kevlar fibers, Nomex fibers, Technora fibers, Haracron fibers, Twaron fibers, fiberglass, glass fibers, and combinations thereof.

9. An electronic communications device in accordance with claim 1 wherein said housing comprises a composite fiber-reinforced plastic (FRP).

10. An electronic communications device in accordance with claim 1 wherein said matrix is selected from the group consisting of epoxy resin, polyester vinyl ester, nylon, a thermosetting resin, and combinations of any of the preceding.

11. An electronic communications device in accordance with claim 1 wherein said mobile electronics communications device is selected from the group consisting of: a radio-telephone, a cellular (cell) phone, a mobile phone, smart phone, flip phone, slider phone, android phone, tablet phone, camera phone, clamshell device, portable networking device, qwerty flip device, wireless device, portable gaming device, mobile communications device, personal digital assistant (PDA), wireless e-mail device, a two way pager, internet communication device, android tablet, ipod, ipad, blackberry, tablet device, laptop computer, notebook, personal computer, hand held electronic device, and combinations of any of the preceding.

12. An electronic communications device, comprising:
a base;
a base housing covering at least a part of said base;
a moveable portion operatively connected to said base, said movable portion operatively connected to said base, moveable portion being moveable from an open position to a closed position and vice versa, and said moveable portion is selected from the group consisting of a flip and a slide;
a moveable housing covering at least part of said moveable portion;
at least one of said housings comprising a composite housing comprising a matrix of conductive and non-conductive fibers, and a conductive housing portion and a non-conductive housing portion;
said conductive housing portion comprises a conductive material; and
said non-conductive housing portion comprises a non-conductive material.

13. An electronic communications device in accordance with claim 12 further comprising:
an antenna operatively connected to and positioned in said base or moveable portion; and wherein
said non-conductive housing portion is positioned in proximity to said antenna.

14. An electronic communications device in accordance with claim 12 further including:
one or more of the following components: touchpad, keypad, display, screen, a printed circuit board, a touch sensitive printed circuit board embedded with capacitive touch traces for detecting a user's finger gestures;
said composite housing comprises a composite fiber-reinforced plastic (FRP);
said conductive material comprises conductive fibers selected from the group consisting of carbon fibers, aluminum fibers, and combinations thereof; and said non-conductive material comprises non-conductive fibers selected from the group consisting of aramid fibers, para-amid fibers, glass fibers, and combinations thereof.

15. An electronic communications device in accordance with claim 12 wherein said flip is connected by a hinge to said base.

16. An electronic communications device in accordance with claim 12 wherein said slide comprises a slidable portion and is slidably connected to said base.

17. An electronic communications device comprising:
moveable sides comprising a base providing a bottom and a top operatively connected to said base, said moveable sides being moveable from an open position to a closed position and vice versa, said top being selected from the group consisting of a flip and a slide, said flip being connected by a hinge to said base, and said slide comprising a slidable portion slidably connected to said base;
an interior antenna positioned internally within an interior of one of said sides;
each of said sides having a housing for covering at least part of said sides;
at least one of said housings comprising a composite fiber reinforced plastic (FRP) housing comprising a matrix of conductive fibers and non-conductive fibers;
said composite fiber-reinforced plastic housing having a substantially greater concentration and amount of non-conductive fibers in proximity to said antenna at a location to substantially minimize interference with radio frequency (RF) signals received by and/or transmitted to said antenna.

18. An electronic communications device in accordance with claim 17 wherein:
said matrix is selected from the group consisting of epoxy resin, polyester vinyl ester, nylon, a thermosetting resin, and combinations of any of the preceding;
said conductive fibers are selected from the group consisting of carbon fibers, aluminum fibers, and combinations thereof; and
said non-conductive fibers are selected from the group consisting of aramid fibers, para-amid fibers, glass fibers, and combinations thereof.

19. An electronic communications device in accordance with claim 17 wherein:
said electronic communications device comprises a mobile electronic communications device selected from the group consisting of a radiotelephone, a cellular (cell) phone, a mobile phone, smart phone, flip phone, slider phone, android phone, tablet phone, camera phone, clamshell device, portable networking device, qwerty flip device, wireless device, portable gaming device, mobile communications device, personal digital assistant (PDA), wireless e-mail device, a two way pager, internet communication device, android tablet, ipod, ipad, blackberry, tablet device, laptop computer, notebook, personal computer, hand held electronic device, and combinations of any of the preceding;

said mobile electronic communications device is of a compact size for readily fitting into a shirt pocket, pants pocket, suit pocket and/or purse; and said composite fiber-reinforced plastic housing is selected from the group consisting of a transceiver housing, base housing, display housing, flip housing, battery door, non-conductive antenna housing and combinations of the preceding.

\* \* \* \* \*